United States Patent
Redford et al.

(10) Patent No.: US 9,460,016 B2
(45) Date of Patent: Oct. 4, 2016

(54) CACHE WAY PREDICTION

(71) Applicant: ANALOG DEVICES TECHNOLOGY, Hamilton (BM)

(72) Inventors: John L. Redford, Arlington, MA (US); Michael G. Perkins, Edinburgh (GB)

(73) Assignee: ANALOG DEVICES GLOBAL HAMILTON (BM)

( * ) Notice: Subject to any disclaimer, the term of this patent is extended or adjusted under 35 U.S.C. 154(b) by 115 days.

(21) Appl. No.: 14/306,162

(22) Filed: Jun. 16, 2014

(65) Prior Publication Data

US 2015/0363318 A1  Dec. 17, 2015

(51) Int. Cl.
  *G06F 12/00*  (2006.01)
  *G06F 12/08*  (2016.01)

(52) U.S. Cl.
  CPC ....... *G06F 12/0864* (2013.01); *G06F 12/0895* (2013.01)

(58) Field of Classification Search
  None
  See application file for complete search history.

(56) References Cited

U.S. PATENT DOCUMENTS

| | | | |
|---|---|---|---|
| 6,643,739 B2 | 11/2003 | Van De Waerdt et al. | |
| 7,769,954 B2* | 8/2010 | Yasufuku | G06F 12/0864 711/118 |
| 8,225,046 B2* | 7/2012 | Licht | G06F 12/0864 711/128 |
| 8,392,651 B2 | 3/2013 | Mylavarapu | |
| 8,738,860 B1* | 5/2014 | Griffin | G06F 12/0897 711/122 |
| 8,886,899 B1* | 11/2014 | Bao | G06F 12/10 710/316 |
| 2002/0056026 A1* | 5/2002 | Matsuyama | G06F 12/0862 711/136 |
| 2004/0015669 A1* | 1/2004 | Edirisooriya | G06F 12/126 711/163 |
| 2006/0248317 A1* | 11/2006 | Vorbach | G06F 15/7867 712/221 |

FOREIGN PATENT DOCUMENTS

| | | |
|---|---|---|
| EP | 1244970 | 6/2003 |
| EP | 1370946 | 4/2014 |

OTHER PUBLICATIONS

Microsoft Computer Dictionary, © 1994, Microsoft Press, p. 334.*

* cited by examiner

*Primary Examiner* — Brian Peugh
(74) *Attorney, Agent, or Firm* — Patent Capital Group (57) ABSTRACT

In an example, a system and method are provided for predicting in which way a requested memory address is most likely to be held in a multi-way cache, based on the last way accessed by the specified address register if available. If not available, then the system may determine that no best prediction is available. In that case, each way is read, and the superfluous values are disregarded, or a cache fill is performed as necessary. In certain embodiments, only a portion of the least significant bits of an add operation are used for way prediction in base-plus-offset addressing modes. This enables the decision to be made before the full-width add is complete, so that the clock cycle length is not unnecessarily lengthened by the prediction operation.

20 Claims, 9 Drawing Sheets

CACHE WAY PREDICTION

FIELD OF THE DISCLOSURE

This application relates to the field of signal processing, and more particularly to a processor configured for cache way prediction.

BACKGROUND

A known method of avoiding excessive "wait states" in a processor—wherein the processor is idly waiting for a memory operation to complete rather than doing useful work—is the use of a dedicated high-speed local memory to the processor. In various architectures, this high-speed memory may take the form of one or more caches or L1, L2, or other local memories, each with its own particular advantages and uses. Throughout this Specification, all such local, high-speed memories are referred to collectively as "caches."

Such local memories are, however, only useful when needed data can be written to or read from the local memory. A "cache miss" occurs specifically when the processor needs a value from a particular memory location, and that memory location has not been loaded into cache. In that case, the memory subsystem may need to perform a cache fill to fetch the needed value from memory, during which time the processor may be at least partly idle.

BRIEF DESCRIPTION OF THE DRAWINGS

The present disclosure is best understood from the following detailed description when read with the accompanying FIGURES. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

In a first example, there is disclosed a computing system comprising a processor; a cache comprising Y cache ways; a register comprising a way region; and circuitry and logic operational for instructing the processor to: access a value from the cache comprising reading values from a plurality of ways and keeping only the value from way W; and encode W in the way region of the register.

In a second example, there is disclosed A cache controller for accessing a Y-way cache, comprising circuitry and logic for accessing a value from the cache comprising reading values from a plurality of ways and keeping only the value from way W; and encoding W in a way region of a register for use in predicting which way to check first on subsequent memory access events.

In a third example, there is disclosed a method for way prediction in a processor having a Y-way cache, comprising accessing a value from the cache comprising reading values from a plurality of ways and keeping only the value from way W; and encoding W in a way region of a register.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

Caches may be divided into different classes, including "direct-mapped" caches and "N-way" caches among others. A value from main memory generally resides within a "cache line" of larger size, L words. For example, an 8-word cache line (L=8) is generally mapped so that memory locations whose addresses only differ in the least significant 3 bits (bits 0 through 2) reside within the same cache line, and hence within the same location in the cache (each location stores an entire cache line). Often the subsequent bits in the address are used to identify the "set" to which the cache line is mapped. For example, in a cache with 8 sets, bits 3 through 5 may identify the set to which the cache line belongs. In other words, only locations whose bits 3 through 5 are b000 may be stored in set 0, while b001s are mapped to set 1, b010s are mapped to set 2, and so forth.

In a "direct-mapped" cache, each set comprises exactly one location ("way") in the cache. This configuration offers certain advantages in terms of speed, power, and cost, but these are realized at the cost of flexibility. To load a value from memory address 0x40, the cache line starting with 0x0 must be displaced by the cache line starting with 0x40, as both of these addresses are mapped to the same location in the cache.

Additional flexibility may be realized by dividing each set into a plurality of N separate ways. In the case of an N-way cache, N may be an arbitrary value, and is often an even power of two, such as 2, 4, 8, or 16 cache ways. The addition of cache ways increases flexibility, but at some compromise in speed, power, or cost. For example, in this 8-set, 4-way cache, values from memory addresses 0x0, 0x40, 0x80, and 0xC0 may all coexist in cache simultaneously. To provide a 4-way (N=4), 8-set (S=8) cache may require up to N×S×L=256 words of memory, but will often offer better performance than a direct-mapped cache of the same size.

Another challenge in providing an N-way cache is that the cache controller does not necessarily know a priori in which way a desired value is stored. Thus, in an example operation, a cache controller may first read N values or tags from cache, one from each way in which the value could possibly be stored. The cache controller then inspects the tags corresponding to each of the cache lines to determine whether any of them contains the desired value. In a best-case scenario, the desired location is in cache, and the processor keeps that one value, while disregarding the other N−1 values read from the cache. If the desired data is not found anywhere in cache, then the cache controller performs a cache fill to load the cache line into cache so that it is available next time a value in the cache line is required.

Advantageously, this method is fast and effective, but it comes at the cost of power and complexity. In a modern, high-efficiency processor, the cache may be accessed on practically every clock cycle that the processor is active. Thus, on every clock cycle, N−1 superfluous tags and/or values are read from cache in the best-case scenario. In the worst-case scenario, N superfluous tags and/or values are read out before the cache controller determines that the value is not to be found in cache and performs a cache fill.

An improvement on this method can be realized by allowing the DAG or cache controller to first determine which way is most likely to have the desired value. If the value is found in that way, then no superfluous values are read from cache. If the determination is wrong, then at worst the processor must perform the prior method, reading all N words out, and/or performing a cache fill if the value is not found.

Because memory is often read sequentially, such as in arrays or other related data sets, the previous successful way hit provides a first-order "best guess" to the appropriate way where a next value is to be found. For example, if register R1 is in a "no hit" state (meaning that it has no previous successful way hit), it will read out all N ways to see if it can find the value in cache, and/or perform a cache fill to fetch the value into cache. Once the value has been successfully located in way W, the N−1 superfluous words are disregarded. On the next read cycle that includes a read from R1, however, the processor may first look for the desired value in way W, rather than loading all N ways. As long as the processor designer is confident that way W will contain the desired value a non-trivial fraction of times, substantial power and cost savings may be realized.

To further refine the method, the processor may also know when it has a "known unknown." When the address register R1 has changed to an unknown address, for example, it may now correspond to a different cache line and the value of "guessing" way W is substantially reduced, making it little better, or perhaps even worse, than a random guess. Thus, in that case, it may be better to read all N ways and discard the N−1 superfluous values. Another example is offset addressing or post-incrementing, where a base address is either offset or incremented to a value past the terminal of the present cache line. In that case, the next value may not be found in cache, or at least there is no reason to suppose it will be found in way W.

Figure 1:
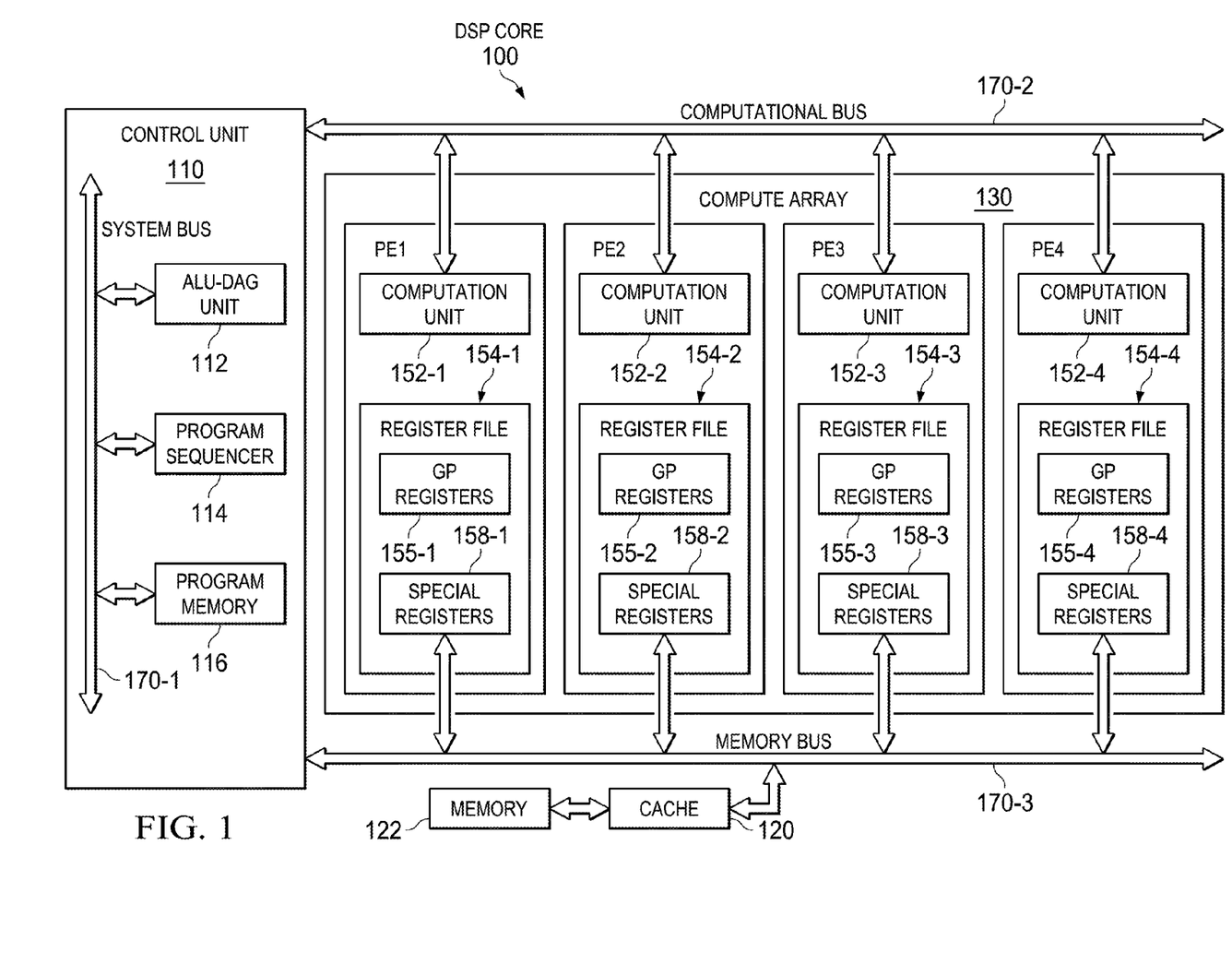
FIG. 1 is a block diagram of a processor according to one or more examples of the present Specification.

Turning now to the appended drawings, FIG. 1 is a schematic block diagram of an example digital signal processor (DSP) core 100 according to one or more examples of the present Specification. It should be noted that DSP core 100 is provided as one non-limiting example of a type of processor, and the term "processor" as used throughout this Specification is intended to broadly encompass any combination of hardware, software, or firmware providing programmable logic, including by way of non-limiting example a microprocessor, digital signal processor, field-programmable gate array, programmable logic array, application-specific integrated circuit, or virtual machine processor. DSP core 100 may form part of a larger "computing device," which in various embodiments may include or be part of, by way of non-limiting example, a computer, embedded computer, embedded controller, embedded sensor, personal digital assistant (PDA), laptop computer, cellular telephone, IP telephone, smart phone, tablet computer, handheld calculator, or any other electronic, microelectronic, or microelectromechanical device for processing and communicating data. FIG. 1 has been simplified for the sake of clarity and to better understand the novel concepts of the present disclosure. Thus, additional features may be added in DSP core 100, and some of the features described below may be replaced or eliminated in other embodiments of DSP core 100.

DSP core 100 may include a control unit 110, a cache 120, memory 122, and a compute array 130. In an example, control unit 110 and compute array 130 constitute a core processor that can perform computation and data processing functions of DSP core 100. Some embodiments of DSP core 100 include other components, such as a microcontroller for executing microcontroller instructions, a direct memory access (DMA) unit, and various interfaces to off-chip devices. Further, although memory 122 is shown here as a single logical block with cache 120 disposed between memory 122 and register files 154, it should be recognized that memory 122 may in various embodiments include system main memory, various levels of on-chip or local memory, cache, and/or other volatile or non-volatile memory technologies.

Control unit 110 facilitates program execution of DSP core 100. Control unit 110 may include an arithmetic logic unit and data address generation (ALU-DAG) unit 112, a program sequencer 114, and a local program memory 116. Control unit 110 may also include other components, such as an instruction cache, a timer, and an instruction register. In an example, ALU-DAG unit 112 supports general purpose integer computations and supplies memory addresses. For example, ALU-DAG 112 provides memory addresses when data are transferred between memory 122 and registers (such as register files of compute array 130, described below). ALU-DAG unit 112 can supply addresses to data memory (for example, memory 122) and/or program memory 116. Program sequencer 114 provides instruction addresses to program memory 116 for instruction fetches. Program memory 116 stores programs that DSP core 100 implements to process data (such as data stored in memory 122) and can also store process data. "Programs," as used throughout this Specification, include any ordered set of executable instructions operable to instruct a processor, such as DSP core 100, to perform a specified task. DSP core 100 may implement programs by fetching the instructions, for example by retrieving them from memory 122 and loading them into program sequencer 114, decoding the instructions, and providing the decoded instructions to processing elements PE for execution, or executing them locally in ALU-DAG unit 112. In an example, programs may include instruction sets for implementing various DSP algorithms, including algorithms that may be performed in parallel by executing them across two or more processing elements PE, or in single-instruction-multiple-data (SIMD) mode, in which two or more processing elements execute the same instruction, as received from program sequencer 114, on different data elements. SIMD is commonly used, for example, for expeditious processing of large data arrays by dividing the array into n subarrays, and then allowing n processing elements to separately process one subarray each.

Memory 122 stores data to be processed by DSP core 100 (data memory), programs implemented by DSP core 100 to process the data (program memory), or a combination thereof. In some examples, memory 122 may have a multi-banked interleaved memory structure, such that memory 122 includes memory banks M1-Mn, where n is a total number of memory banks of memory 122. In an example, memory 122 is a random access memory, such as a static random-access memory (SRAM), dynamic RAM (DRAM), read-only memory (ROM), flash memory, or other suitable memory technology. In an example, one or more memory banks M are a separate RAM. Alternatively, memory 122 may represent a multi-tiered memory structure, including for example a fast L1 memory, an intermediate L2 memory, and a slow main memory, wherein the size and cost of each memory may vary inversely with the access speed of the memory. In yet another example, memory 122 may include a cache, or any other suitable type of memory. In some cases, a direct memory access (DMA) controller may also be provided to enable DMA operations from DSP core 100 to memory 122.

By way of example, three buses 170 are shown. As used throughout this Specification, a "bus" includes any interconnection line, network, connection, bundle, single bus, multiple buses, crossbar network, single-stage network, multistage network or other conduction medium operable to carry data between parts of a computing device, or between computing devices. Where necessary or appropriate, buses 170 may also include appropriate controllers, such as a memory management unit (MMU) or similar. In this example, a main system bus 170-1 is provided to communicatively couple DSP core 100 to other system components, as discussed by way of more detailed example in FIG. 2. Computational bus 170-2 communicatively couples compute array 130 to control unit 110. Memory bus 170-3 communicatively couples processing elements PE to memory 122. It should be noted that these uses are disclosed by way of non-limiting example only, and that some embodiments may omit one or more of the foregoing buses, while others may employ additional or different buses.

Control unit 110 may issue instructions and data addresses to compute array 130 via computational bus 170-2. Computational bus 170-2 transfers addresses for instructions and data to various processing elements PE of compute array 130. Memory bus 170-3 may transfer data and/or instructions from memory (such as memory 122, program memory 116, other memory, or a combination thereof), such that contents of any register in DSP core 100 can be transferred to any other register or to any memory location and memory 122 can provide data operands (values) to compute array 130.

In the example shown, compute array 130 includes four processing elements PE1-PE4. In other embodiments, compute array 130 may include zero or more discrete processing elements. Processing elements PE perform numeric processing, and in an example may include specialized hardware for carrying out specific types of computations such as DSP algorithms. Processing elements PE may operate independently, in parallel, or as a SIMD engine. In the present example, each processing element PE may be a vector processor. Alternatively, processing elements PE may be scalar processors, or a combination of scalar processors and vector processors.

Processing elements PE each include a respective computation unit (CU) 152. In the depicted embodiment, computation units 152 may be identical, although the present disclosure contemplates embodiments where computation units 152 are not identical. The present disclosure further contemplates configurations where one or more processing elements PE do not include a computation unit 152. In the present example, computation units 152 each include an arithmetic logic unit (ALU), a multiplier-accumulator (MAC), a shifter, other computational unit, or combinations thereof. An ALU can perform arithmetic and logic operations, such as add, subtract, negate, increment, decrement, absolute value, AND, OR, EXCLUSIVE OR, NOT, divide primitive, other arithmetic operations, other logic operations, or combinations thereof. An example MAC can perform multiplication operations as well as multiply and accumulate operations, such as single-cycle multiply, multiply/add, multiply/subtract, other operations, or combinations thereof. A shifter can perform logical and arithmetic shifts, bit manipulations, normalization, denormalization, derive-exponent operations, other operations, or combinations thereof. The various arithmetic operations, logic operations, and other operations can be performed on both fixed-point and floating-point formats. In various embodiments, the ALU, MAC, and/or shifter include registers associated therewith.

Processing elements PE may also each include a respective register file 154. In the depicted embodiment, register files 154 may be identical, although the present disclosure contemplates embodiments where register files 154 are not identical. The present disclosure further contemplates configurations where one or more processing elements PE do not include a register file 154. Register files 154 include registers that transfer data between processing elements PE and memory bus 170-3 and stores results. In the present example, register files 154 can include a respective general purpose register set 155 that include general purpose registers having widths dependent on design requirements of DSP core 100, such as 32-bit general purpose registers, 40-bit general purpose registers, 64-bit general purpose registers, 128-bit general purpose registers, other width general purpose registers, or a combination thereof. For purposes of the following discussion, general purpose registers 155 include 32-bit general purpose registers. In the present example, register files 154 each include both general-purpose registers 155 and special registers 158, which may include any registers needed for carrying out way prediction as described herein. Depending on context, in certain architectures any general purpose register 155 or special register 158 may be used as any of the purpose-designated registers of FIG. 4, such as address register 410, offset register 430, and data register 480. In other examples, certain registers within special registers 158 may be specially designated as one or more address registers 410, offset registers 430, and/or data registers 480.

DSP core 100 can perform various parallel operations. For example, during a single cycle, processing elements PE may access an instruction (via interconnection network 142) and access N data operands from memory (via memory bus 170-3) for synchronous processing. In SIMD mode, DSP core 100 may process multiple data streams in parallel. For example, when in SIMD mode, DSP core 100 in a single cycle may dispatch a single instruction to each or a plurality of processing elements PE via computational bus 170-2; load N data sets from memory (memory 122, program memory 116, other memory, or a combination thereof) via memory bus 170-3, one data set for each processing element PE (in an example, each data set may include two data operands); execute the single instruction synchronously in processing elements PE; and store data results from the synchronous execution in memory 122.

Figure 2:
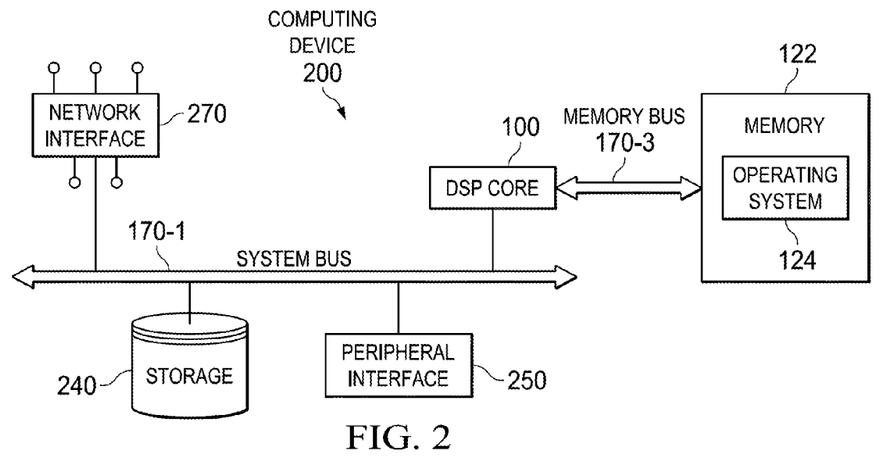
FIG. 2 is a block diagram of a computing system according to one or more examples of the present Specification.

FIG. 2 is a block diagram of a computing device 200 according to one or more examples of the present Specification. As described with reference to FIG. 1, computing device 200 includes a DSP core 100 communicatively coupled to a system bus 170-1 and a memory bus 170-3. Memory bus 170-3 communicatively couples DSP core 100 to memory 122, which has loaded therein an operating system 122 providing low-level services for application software. This Specification contemplates, however, embodiments wherein a traditional operating system 122 may be unnecessary, such as in embedded systems or controllers, wherein applications may run on "bare metal."

A storage 240 may communicatively couple to DSP core 100 via system bus 170-1. Storage 240 may be a species of memory 122. In some embodiments, memory 122 and storage 240 may be separate devices, with memory 122 being a relatively low-latency volatile memory device, and storage 240 being a relatively high-latency non-volatile memory device. Storage 240 may also be another device, such as a hard drive, solid-state drive, external storage, redundant array of independent disks (RAID), network-attached storage, optical storage, tape drive, backup system, cloud storage, or any combination of the foregoing. Storage 240 may be, or may include therein, a database or databases or data stored in other configurations. Many other configurations are also possible, and are intended to be encompassed within the broad scope of this Specification. In an example, program execution involves loading instructions from storage 240 into memory 122. Instructions are then fetched into DSP core 100 for execution. Data may also be loaded from storage 240 into memory 122 for availability to DSP core 100 during program execution.

A network interface 270 may communicatively couple to DSP core 100, and may be operable to communicatively couple DSP core 100 to a network. In this Specification, a "network" includes any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

A peripheral interface 250 communicatively couples to DSP core 100 via system bus 170-1, and may be operable to communicatively couple DSP core 100 to one or more peripherals. As used in this Specification, a "peripheral" includes any auxiliary device that connects to computing device 200 but that is not necessarily a part of the core architecture of computing device 200. A peripheral may be operable to provide extended functionality to computing device 200, and may or may not be wholly dependent on computing device 200. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Note that the components described in FIG. 2 are provided by way of example only, and are not intended to limit computing device 200 to the particular configuration shown. Any component of FIG. 2 may be omitted in appropriate circumstances, while in other appropriate circumstances, any component may be duplicated as necessary, or combined with another component. For example, in some cases, network interface 270 may be used to provide connectivity to certain peripherals, so that the function of peripheral interface 250 is subsumed therein. Thus, it should be understood that the division between components herein is not intended to imply a necessary or strict physical division. Rather, components are divided according to logical functions, and where appropriate, a single device may perform a plurality of functions. In one example, computing device 200 may be provided, in its entirety, as a system-on-a-chip (SoC), wherein some or all of the functions disclosed herein may be provided in a single monolithic semiconductor device.

Figure 3A:
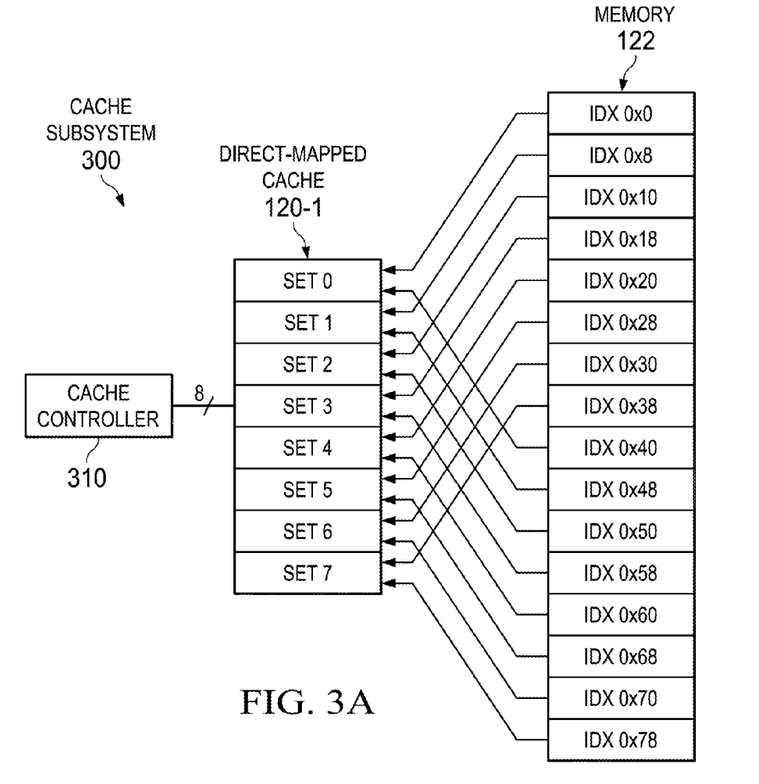
FIGS. 3A and 3B are block diagrams of multi-way caches according to one or more examples of the present Specification.
Figure 3B:
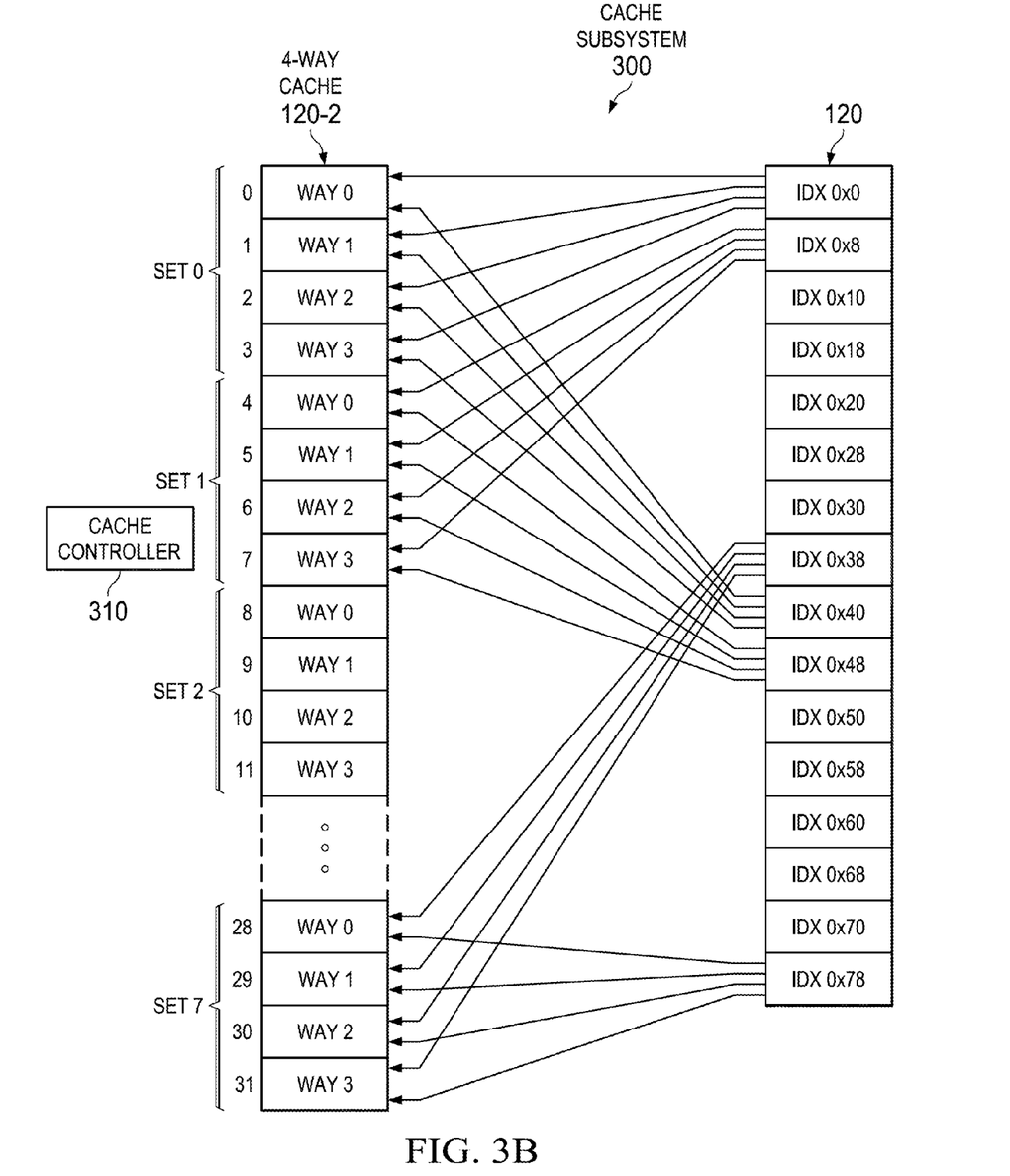

FIGS. 3A and 3B are block diagrams of a cache according to one or more examples of the present Specification. In FIG. 3A a direct-mapped cache 120-1 is disclosed. Cache controller 310 is provided to address direct-mapped cache 120-1. Cache controller 310 receives an address for a memory location to access, and uses the address to access direct-mapped cache 120-1.

In this example, direct mapped cache 120-1 includes a number of bits, bytes, characters, words, or other divisions of memory appropriate to the application. Throughout this Specification, words are used by way of non-limiting example to illustrate the methods and structures disclosed herein. It should be understood, however, that any reference to a data "word" read out of cache 120 or memory 122 is intended to broadly encompass any suitable memory element or division.

Direct mapped cache (which can be thought of as comprising a number of sets which consist of only a single way each) 120-1 includes eight separate sets in this example. Each cache set is configured so that each value from main memory 122 may be mapped into only one set. This may be based, for example, on a portion of the least bits of the address from memory 122. It should be noted that this is provided by way of example only, and that there are numerous methods in which memory can be addressed and managed in a cache subsystem 300. In this example, memory addresses are mapped based on a value from 0 to 7, which may be encoded in the bits 3 through 5 of the address in RAM. Thus, index 0x0 and index 0x40 can only be stored in set 0, index 0x8 and index 0x48 can only be stored in set 1, index 0x10 and index 0x50 can only be stored in set 2, and so forth.

While this configuration has advantages in speed and complexity, it faces some limitations in storage flexibility. For example, if a program is written in such a way that it needs to access index 0x0 and index 0x40 in turn repeatedly, then on each load instruction, the cache will be filled on the very next read, a cache miss will occur, because index 0x40 will not and cannot be stored in direct mapped cache 120-1 at the same time as index 0x0. Thus, set 0 will have to be flushed and filled from cache on each iteration. On the next read the cache-miss-and-flush cycle will repeat. This will continue through each iteration of the memory needing to access both index 0x0 and index 0x40. This may result in significant processing delays, because each memory access will have to retrieve the value from memory 122 instead of directly from direct mapped cache 120-1. This may be referred to as "thrashing."

Thrashing can be avoided by writing a program so that it does not simultaneously or consecutively access index 0x0 and 0x40 in this manner. However, at design time or compile time, a program designer may not know which specific index locations a program will need to access. In other cases, a designer may be writing a program to be portable across a plurality of processor architectures, and thus may not know in advance the size and type of cache that may be provided. Even with a good optimizing compiler, it is not always possible to know beforehand whether thrashing or other sub-optimal behavior will occur. Thus, it is advantageous to design a processor and system wherein thrashing can be minimized by providing additional flexibility within cache 120.

FIG. 3B discloses an example in which additional flexibility is provided for cache 120 by providing additional ways. In this example, cache controller 310 generates an address and retrieves that value from four-way cache 120-2. Four-way cache 120-2 is somewhat more complex then direct mapped cache 120-1, in that it is configured so that each location and memory may be provided in any of four locations within four-way cache 120-2. For example, memory indexes 0x0 and 0x40 may be found in any of the four ways of set 0, memory indexes 0x8 and 0x48 may be found in any of the four ways of set 1, memory indexes 0x10 and 0x50 may be found in any of the four ways of set 2, and so on. Note that 4-way cache 120-2 includes sets 3-6, which are not shown to simplify the drawing. For purposes of discussion, it can be assumed that 4-way cache 120-2 is a 4-way, 8-set cache with an 8-word cache line size.

Thus, in this example, if a program needs to alternately access index 0x0 and index 0x40, index 0x0 may be loaded into Set 0, Way 0, while index 0x40 may be loaded into Set 0, Way 1. Thus, on the first cycle, cache controller 310 may address four-way cache 120-2 to find index 0x0 stored in Set 0, Way 0. This represents a cache hit. On the next cycle, cache controller 310 may address 4-way cache 120-2 and find index 0x40 stored in Set 0, Way 1, also a cache hit. On the next several cycles each access to locations 0x0 and 0x40 in turn result in a cache hit. Thus, no cache misses and expensive cache fills are required.

The operation of 4-way cache, however, comes at a cost. Because index 0x0 may be found in any of the ways of set 0, the cache controller 310 does not know beforehand whether index 0x0 is located in Way 0, Way 1, Way 2, or Way 3.

For increased speed, cache controller 310 may access all four ways to determine whether the desired value is in one of them. If the desired value is not found in any of the ways, then cache controller 310 performs a cache fill from memory 122. In the best case scenario if the value is found in one of those locations, then four values will be read from 4-way cache 120-2, and only one of them will be the desired value. The other three will be disregarded. Because a properly operating processor will access 4-way cache 120-2 on almost every cycle, this means that, at best, three extra read operations will be performed on each cycle, with the result of those three extra reads being disregarded. Although this is a relatively fast solution, inasmuch as cache reads are extremely fast, in some embodiments, it does result in cache controller 310 drawing additional unnecessary power.

Substantial power savings may be realized if cache controller 310 can predict in advance which way W is most likely to hold the desired value within 4-way cache 120-2. In that case, cache controller 310 can read only the most likely value from 4-way cache 120-2. If W proves to be the right way, then the read has been successful without needing to retrieve extra, unnecessary information. If W is not the right way, then the other ways will need to be checked. In an example, cache controller 310 may initiate a cache fill first. While the cache fill is pending, cache controller 310 may check all four ways of 4-way cache 120-2 to see if the desired value is anywhere in cache. Although this is relatively unlikely, the check may be necessary to ensure that two copies of the same memory location do not end up in 4-way cache 120-2. If the value is found in 4-way cache 120-2, then the pending cache fill may be aborted.

Figure 4:
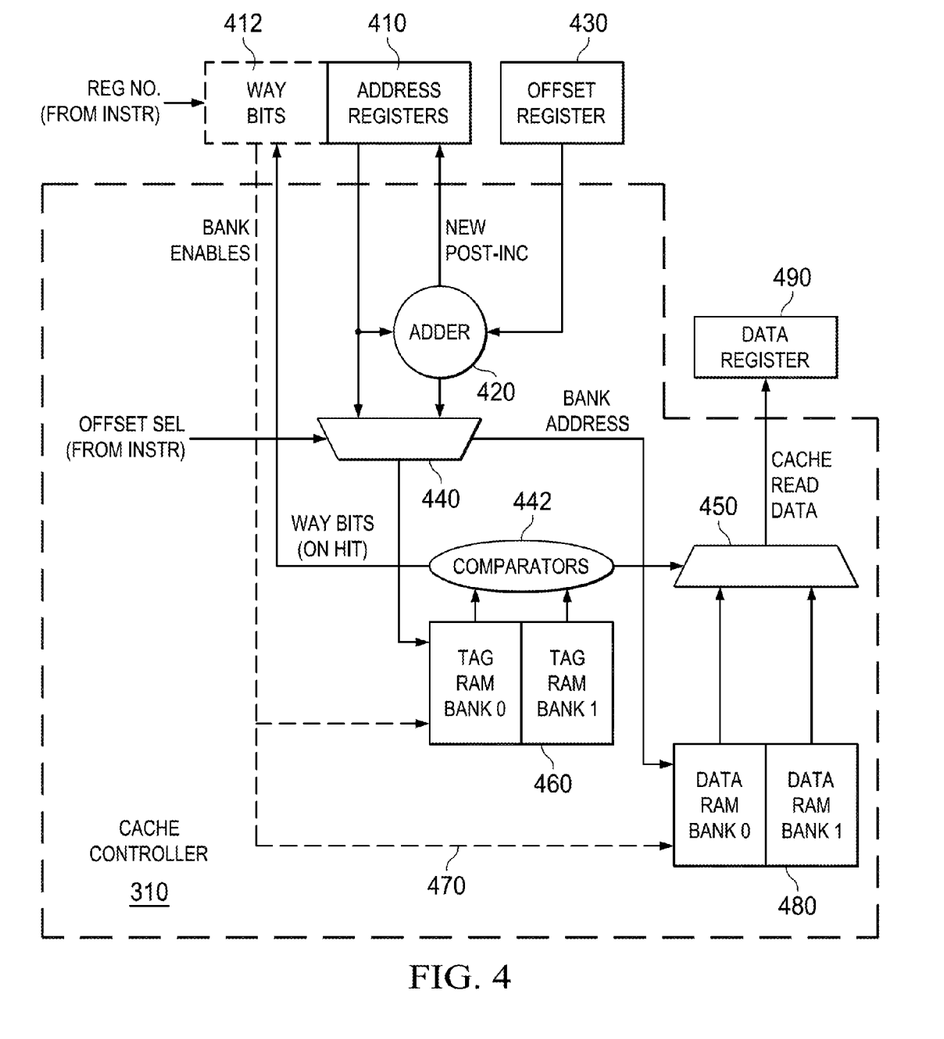
FIG. 4 is a block diagram of a cache subsystem according to one or more examples of the present Specification.

FIG. 4 is an expanded block diagram of a combined DAG and cache controller 310 according to one or more examples of the present Specification. The DAG accesses one or more address registers 410, each of which include way bits 412. Offset register 430 is provided, along with an adder 420, process selection logic 440, comparators 442, tag RAM banks 460, data RAM banks 480, selection logic 450, and data registers 490. It will be noted that certain of the elements disclosed within cache controller 310 in FIG. 4 are disclosed in other views in other FIGURES. Thus, it should be recognized that FIG. 4 does not disclose necessarily a required physical configuration of the disclose elements, but rather discloses a functional arrangement. It should also be noted that address register 410, offset register 430, and data register 490 may, in some cases, be any suitable register, such as a general purpose register 155. The designation of these as purpose-designated registers is provided merely by way of illustration. A primary purpose of cache controller 310 is to load into data register 490 a value from memory whose address is provided by address register 410, or whose address is provided by address register 410 plus offset register 430. Address register 410 may be post-incremented, meaning that after address register 410 is used to address a memory location, it is incremented by a second value. This type of addressing may be useful, for example, in iterating through a loop or other structure where it is useful to address a sequence of memory elements in order.

In an example, address register 410 may include a base address or an absolute address. Address register 410 may provide its base address to adder 420, and offset register 430 may provide an offset value for offset addressing modes. In this example, offset-style addressing may be employed, for example in a linear array, where it is most logical to address the array in terms of the base address plus an offset. In post-increment addressing, adder 420 may increment the address and provide the incremented value back to address register 410. In other addressing modes, address register 410 may provide an address directly.

The result of an add operation or post-increment may be used to predict whether the next value is likely to be found in cache, by determining whether the new address is within the present cache line. For example, if register R2 contains the value 0x6, and if addresses 0x0-0x7 are presently in a cache line, then the pseudoinstruction "LD R1, @(R2+5)," ("load the value at address R2+5 into register R1") is unlikely to be in cache, as R2+0x5=0xB, which is outside the present cache line. Thus, attempting to use the last way W as a "best guess" for the next address may be unlikely to succeed.

However, in certain embodiments, adder 420 may create an unacceptably long delay to the clock cycle length if a full-width addition must be completed before a decision can be made on whether the new address is likely to be in the cache line. In that case, only a portion of the least significant bits may be used for the cache prediction. For example, with a 32-bit address width, the most significant bits are not likely to be predictive, because they will only change if an array is millions of words long. While not impossible, this case is rare, so waiting for the upper 16 bits (for example) of the add operation may yield little useful information in exchange for a very long delay. Similarly, the least significant few bits—such as the bottom three bits that correspond to a particular set of an 8-set cache—are also not useful, as they are not used to distinguish between different cache lines. However, the next several bits may be highly predictive of whether the present add operation will exceed the cache line. For example, assuming that bits 0-2 of the address contain only information on where the value resides within a cache line, the next eight bits (3-10) are exactly predictive of whether the cache line has been exceeded for any pair of addresses that differ by up to 2047 (corresponding to array jumps of 2047 words, for example). In other words, if one of those bits changes, then the present cache line has been exceeded and a cache fill may be necessary, while if the bits stay the same, the new address is likely to be in the cache line.

This prediction will fail in some cases where the new address is more than 2047 words from the old address. In that case, cache controller 310 may make an erroneous prediction. However, the cost of an erroneous prediction is merely a possibly failed attempt to read from way W. In one example, the number of bits to use for the prediction are selected to be the maximum number of bits that can be provided without extending the length of the processor's existing clock cycle.

Selection logic 440 receives a selection signal, for example from the instruction performing the read or write operation, indicating whether the address from address register 410 should be used directly, or whether offset register 430 should be applied. Selection logic 440 provides an address to get RAM banks 480, and also may provide the address back to RAM banks 460. When the address is selected, DRAM bank 480 provides data values to selection logic 450, while comparators 442 are used to select which value from data RAM bank 480 is to be provided to the register 155 that requested the data value.

Way bits 412 of address register 410 may provide bank enable signals 470 to both tag banks 460 and data RAM banks 480. In one example, a Y-way cache may include Y way bits, so that each way bit is capable of providing an enable signal to its corresponding way. In other examples, $2^n$ ways may be encoded in n way bits, and additional logic may provide a selection signal. Way bits 412 are used to select a particular bank from tag banks 460 and data banks 480. Thus, in a case where a particular way provided a successful data read on a previous instruction which used the same address register, way bits 412 will store that way, and use it to enable banks 460 and 480. Additional bits may be provided for "no hit" and "wait for way" flags.

When proceeding to the next address location, several addressing modes may be used. For example, address register 410 may be set to an unrelated address, or a post increment from adder 420 may be provided to address register 410, so that the next address refers to a subsequent element of the array, or field of a structure.

Thus, in certain embodiments, the different banks of data RAM banks 480 represent a plurality of ways. Only one of these ways returns a value, based on the selection from comparator 442. Comparator 442 is controlled in some cases by way bits 412, which represent the last successful read operation from cache 120 from address register 410. However, as seen in the Specification, additional logic may be provided for cases where the last successful cache way is not expected to be the correct cache way.

FIGS. 5A-5F are flow diagrams of methods performed by DSP 100 according to one or more examples of the present Specification. FIGS. 5A-5E together disclose particularly a method of setting status flags of way bits 412.

Figure 5A:
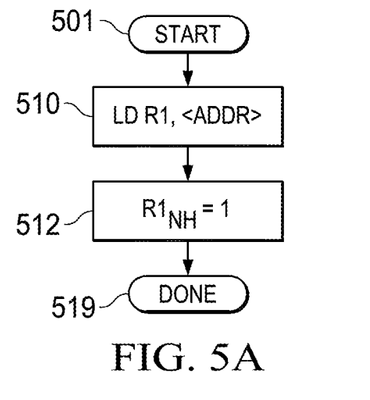
FIGS. 5A-5F are flow diagrams of way prediction according to one or more examples of the present Specification.

FIG. 5A discloses method 501. In block 510, DSP 100 executes the pseudoinstruction "LD R1, <addr>.". In this example, register R1 acts as data register 490, and no other registers are involved. This notation indicates that a value is loaded from memory 122 into register R1. Because the value of R1 was loaded from memory, we do not know where this value may point to in memory, and therefore there is no previous way to use for future predictions of which way the data is likely to reside in when we access the data pointed at by the value in R1.

Each register may include way bits 412. In this case, register R1's NH ("no hit") bits have been set, which indicates that there is insufficient information to provide a useful best guess of which way to access for any future dereference of the address in R1. In block 512, $R1_{NH}$ is set to 1.

In block 519, method 501 is done.

Figure 5B:
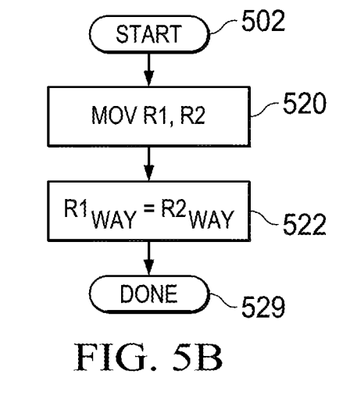

FIG. 5B discloses example method 502. In block 520, DSP 100 executes the pseudoinstruction "MOV R1, R2," meaning copy the contents of register R2 into register R1. In this case, no offset register 430 is used. This may be performed, for example, when register R2 was previously used as address register 410, and register R1 is now to be used as address register 410. In that case, the way bits for R2 are predictive for R1. Furthermore, even if R2 has been used as a data register 490, no harm is done by copying the way bits, so there may be no need to determine what role R2 has filled before copying the way bits.

In block 522, $R2_{WAY}=R1_{WAY}$, meaning the way bits from register R2 are copied into register R1's way bits.

In block 529, method 502 is done.

Figure 5C:
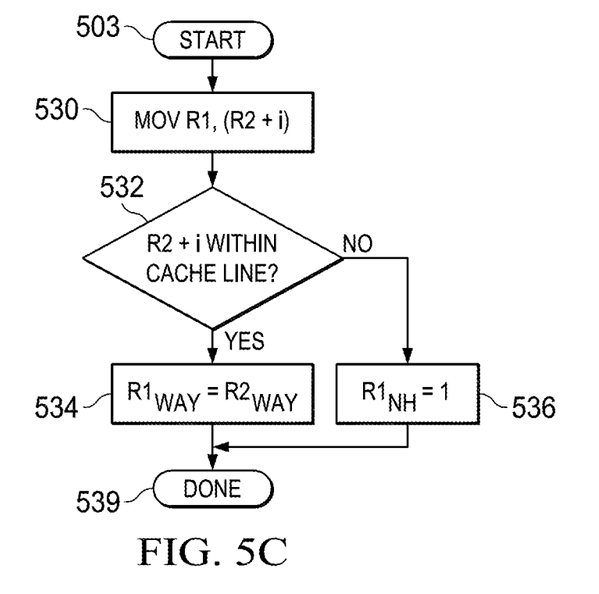

FIG. 5C discloses example method 503. In example method 503, an addition operation is performed. In this case, register R2 is used as address register 410, while a variable i is a constant in the instruction opcode or is provided by offset register 430. R1 acts as a second address register 410. Thus, R1 is assigned the value R2+i.

In block 530, DSP 100 executes pseudoinstruction MOV R1, (R2+i).

In block 532, a check is performed whether the value R2+i is within the current cache line. If it is, then in block 534, way bits from R2 are copied to the way bits from R1, because the way bits of R2 are a good predictor of the way in which the data pointed to by R1 will reside.

In block 536, if R2+i is not within the present cache line, then $R1_{NH}$ is set to true.

In block 529, method 503 is done.

Figure 5D:
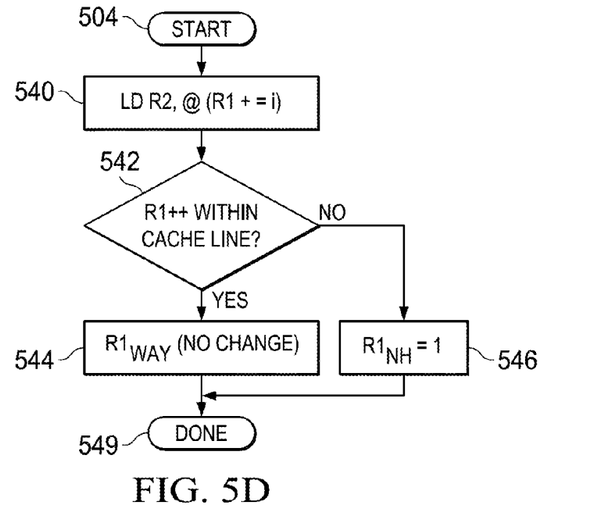

FIG. 5D is a block diagram of a method 504. Method 504 represents a post-increment load operation, wherein R2 acts as data register 490 and R1 acts as address register 410. Throughout this specification the notation "@" indicates "memory location pointed to by what follows." After a value has been loaded from @R1, R1 is incremented (by some value). This is illustrated in FIG. 4, as adder 420 feeds back to address register 410.

In block 540, the pseudo-code instruction "LD R2, @(R1+=i) is executed. Again, variable i is a constant in the instruction opcode or is provided by offset register 430. This means that register R1 contains an address of a value to be loaded into register R2. After register R1 is used, it is incremented by i so that it points to another memory location in a memory structure.

In block 542, a check is performed whether the value of R1+i is within the present cache line. In block 544, if it is, then $R1_{WAY}$ is maintained in its present form, and method 505 of FIG. 5E may also be performed.

In block 546, if R1+i is not within the present cache line, then $R1_{NH}$ is set to 1. This is because cache controller 310 does not know in which way, if any, the next value pointed to by R1 is likely to reside.

In block 549, the method is done.

Figure 5E:
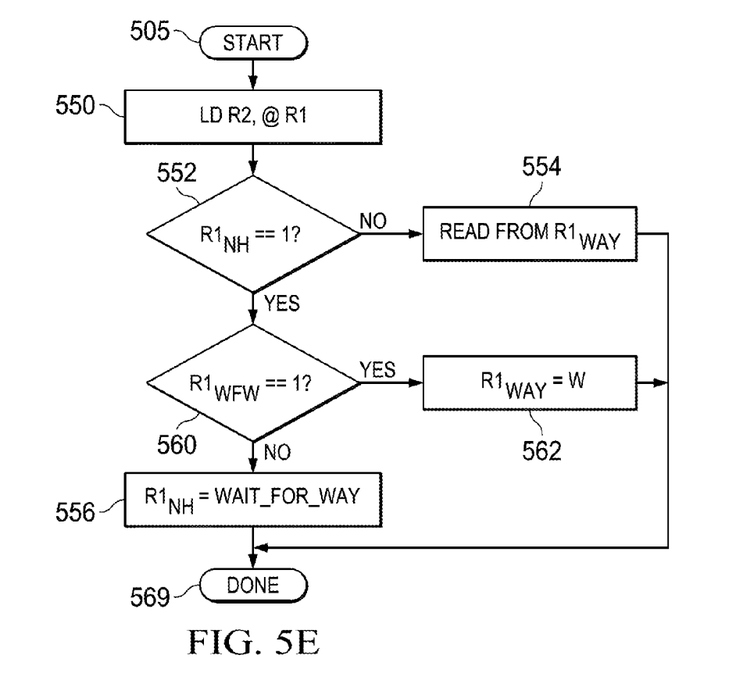

FIG. 5E is a flow diagram of method 505 according to one or more examples of the present Specification. In this case, R1 is used as address register 410, and R2 is used as data register 490.

In block 550, DSP 100 executes the pseudoinstruction "LD R2, @R1," meaning that the value pointed to by R1 is loaded into R2. In block 552, there is a check whether $R1_{NH}$ is set. If it is not, then in block 554, cache controller 310 reads the value from $R1_{WAY}$, meaning that way bits of register R1 are used to select which way to try from cache 120.

If $R1_{NH}$ is set, then in block 560, there is a check whether R1's "wait for way" (WFW) flag is set. This flag is provided to ensure that when the cache way for the access is determined, that the register way bits are updated only if the register has not changed to an unrelated value in the meantime.

In block 562, the way bits of register R1 will receive the variable W, meaning the value of the last successful way hit. In in block 556, if $R1_{WFW}$ is not set, then in block 556, then $R1_{WFW}$ is set to 1. $R2_{NH}$ may also be set to 1, since the last value was loaded from main memory 122.

In block 569, the method is done.

Figure 5F:
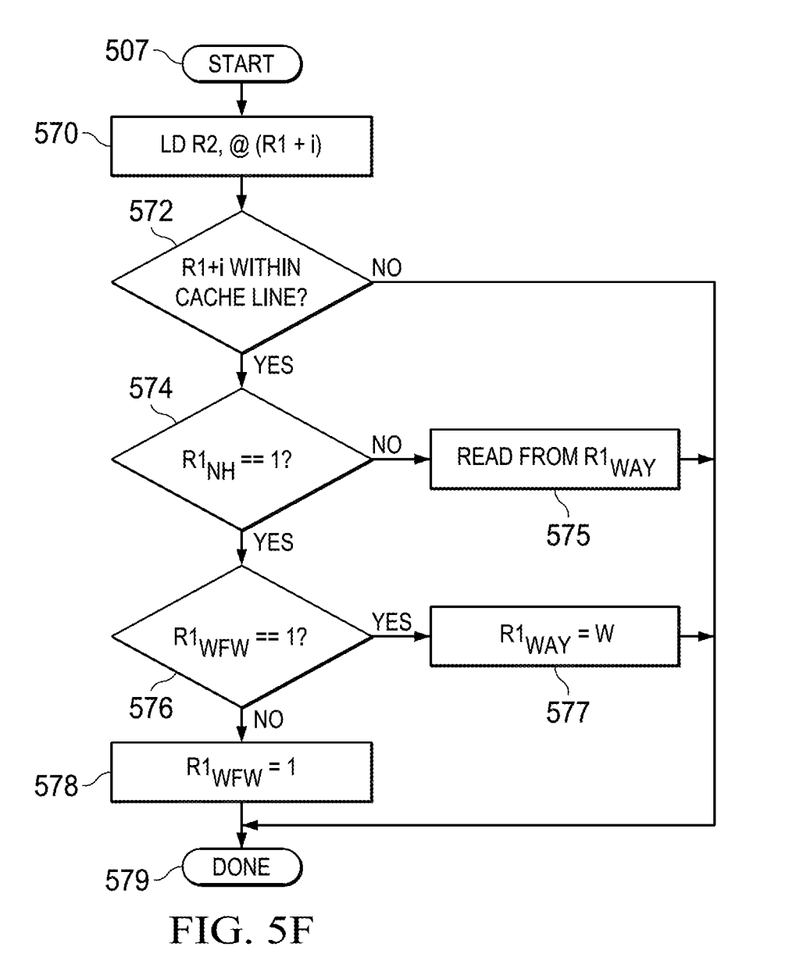

FIG. 5F is a flow diagram of a method 507 according to one or more examples of the present Specification. Method 507 illustrates manipulation of WFW bits when accessing (R1+i). Note that in certain examples, method 505 of FIG. 5E may be considered a special case of method 507, where i==0.

In block 570, DSP 100 executes the pseudoinstruction "LD R2, @(R1+i)," meaning that the value pointed to by R1+i should be loaded into register R2.

In block 572, there is a check whether R1+i is within the present cache line. If it is not, then control passes to block 579, and method 507 is done.

Returning to block 572, if it is in the present cache line, then in block 574, there is a check whether $R1_{NH}$==1. If it does not, then in block 575, the value is read from $R1_{WAY}$, and in block 579, the method is done.

Otherwise, in block 576, there is a check whether $R1_{WFW}$==1. If so, then in block 577, $R1_{WAY}$ is set to W, and in block 579, method 507 is done.

If not, then in block 578, $R1_{WFW}$ is set to 1, and in block 579, the method is done.

Figure 6A:
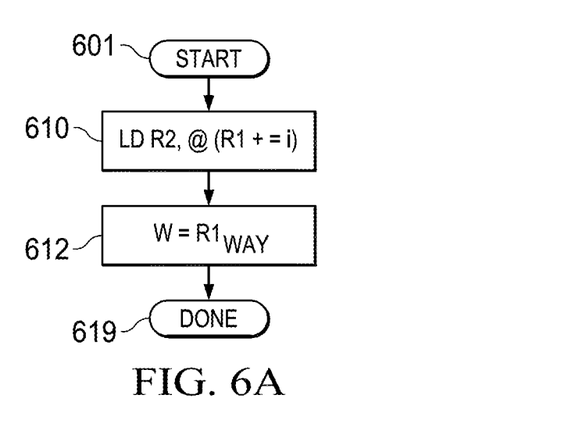
FIGS. 6A and 6B are flow diagrams of way prediction according to one or more examples of the present Specification.
Figure 6B:
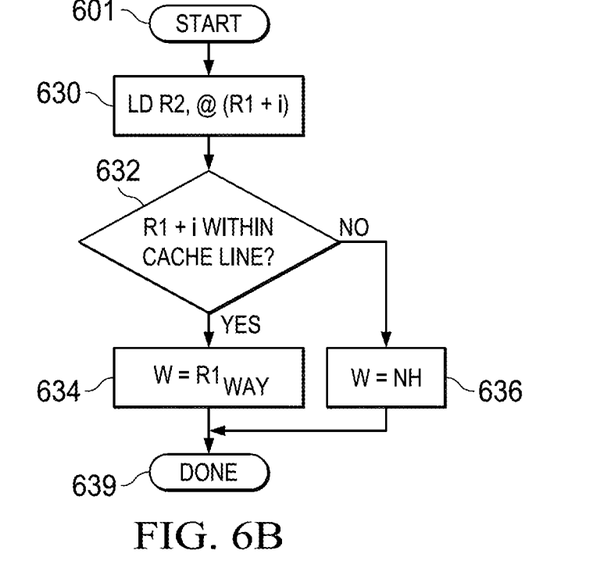

FIGS. 6A and 6B are flow diagrams of example methods of setting the W variable according to one or more examples of the present Specification.

FIG. 6A discloses method 600.

In block 610, DSP 100 performs the pseudocode operation "LD R2, @(R1+=i)". In this case, R1 is address register 410, pointing to a value to be loaded into R2, which is data register 490. After being used to address the value, R1 is post incremented by variable i.

In block 612, the variable W is set to the substantive (i.e., non-flag) portion of way bits 412 of R1, or $R1_{WAY}$.

In block 619 the method is done.

FIG. 6B discloses method 601. In this case, offset-based addressing is used. That means that register R2 will be loaded with the value pointed to by an address computed by R1+i, in which i is an offset from the base address.

In block 630, DSP 100 performs the pseudocode operation "LD R2, @(R1+i)."

In block 632, there is a check whether R1+i is within the present cache line. In block 636, if it is not within the present cache line, then W is set to no-hit. In block 634, if R1+i is within the present cache line, and W is set to the way bits of register R1.

In block 639, the method is done.

Figure 7A:
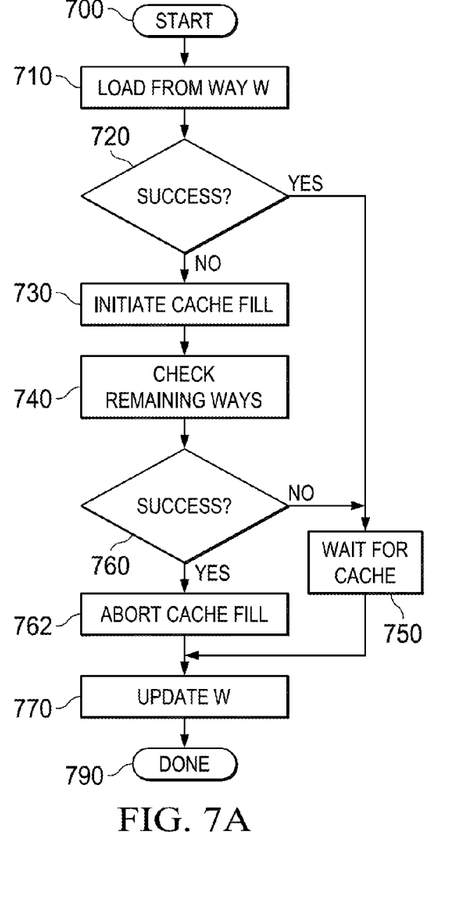
FIGS. 7A and 7B are flow diagrams of way prediction according to one or more examples of the present Specification.
Figure 7B:
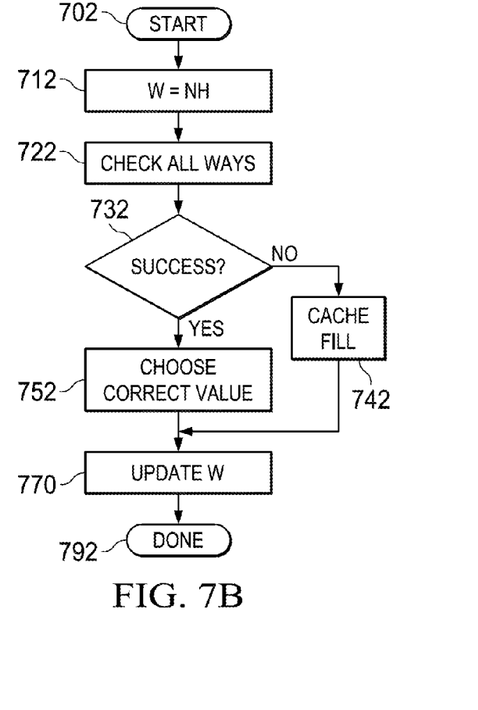

FIGS. 7A and 7B disclose example methods of accessing a value from a predicted way (i.e. when W is not no-hit) according to one or more examples of the present Specification.

FIG. 7A discloses method 700. In block 710, when a memory access operation is performed, such as those disclosed in the previous FIGURES, cache controller 310 first looks to see if the requested value is in way W of cache 120.

In block 720, there is a check whether the memory access was successful, meaning that cache controller found the requested value in way W. If the memory access from way was successful, then in block 790 the method is done. This path represents an optimal operating condition, in which the value of W is set and is valid, and in which it correctly predicts which way to access the value from. This means that no extra steps are required, and no unnecessary read operations are performed from the other ways of cache 120.

Following the path from block 720 to block 730, if the access was not successful, then cache controller 730 may initiate a cache fill.

In block 740, cache controller 740 may check remaining ways to see if the value is in one of the other ways.

In block 760, there is a check whether the value was successfully found in any of the other ways.

In block 762, if the value was found in one of the other ways, then in block 762 the cache fill is aborted. Then in block 770, W is updated with the new value.

In block 750, if the check of remaining ways was not successful, then cache controller 310 waits for the cache fill initiated in block 730 to finish. Then in block 770, W is updated with the way that the value was loaded into during the cache fill.

Note that in some embodiments, the cache fill of 730 may not be initiated automatically after block 720. Rather, the check of block 740 may be performed first, and the cache fill of block 730 may be performed only in the "NO" branch of block 760. In those embodiments, block 762 may be unnecessary. The choice of which embodiment may be driven by design considerations in specific applications. In some cases, a user- or firmware-controllable variable may be provided so that both methods may be provided as options.

In block 790, the method is done.

FIG. 7B discloses method 702. FIG. 7B is executed when it is known that there is no prediction of a best possible way, such as what the W variable is set to. Thus, in block 712, W=NH.

In block 722, the values from all ways where the desired data may be are loaded. In block 732, if the requested value was found, then no cache fill is necessary. In block 742, if the value was not found in any of the possible ways, then the value is not in cache and a cache fill is necessary.

In block 770, W is updated with the way that the requested value was loaded into during the cache fill of block 742, and in block 792, the method is done.

In the "YES" branch of block 732, the requested value is found in cache. In block 752, the correct value is chosen, while the other values are ignored. In block 770, W is updated with the way where the requested value was found.

In block 792, the method is done.

Note that the activities discussed above with reference to the FIGURES are applicable to any integrated circuits that involve signal processing (for example, gesture signal processing), particularly those that can execute specialized software programs or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily be part of smartphones, tablets, security systems, PCs, gaming technologies, virtual reality, simulation training, etc.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed FIGURES, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A computing system comprising:
  a processor;
  a cache comprising N cache ways;
  a register; and
  circuitry and logic operational for instructing the processor to:
    access a value from the cache comprising reading values from a plurality of ways and keeping only the value from a way W; and
    encode W in way bits of the register.

2. The computing system of claim 1, wherein the register comprises N way bits, a wait-for-way flag, and a no-hit flag.

3. The computing system of claim 1, wherein circuitry and logic are further operational for instructing the processor to check way W for a desired value without accessing any additional ways in the cache.

4. The computing system of claim 1, further comprising an adder, and wherein the circuitry and logic are further operable to instruct the processor to:
  search way W for the desired value only if the result of an add operation in the adder indicates that the desired value is within a present cache line.

5. The computing system of claim 4, wherein the result of the add operation comprises only a portion of the full add operation.

6. The computing system of claim 4, wherein the result of the add operation comprises only a portion of the least significant output bits of the adder.

7. The computing system of claim 1, wherein the circuitry and logic are further operable to instruct the processor to:
  access a first value in cache, determining that a no-hit bit is set, and set a wait-for-way bit; and
  access a second value in cache, and determine that the wait-for-way bit is set, receive W from the cache, and encode W in the register.

8. A cache controller for accessing an N-way cache, comprising circuitry and logic for:
  accessing a value from the cache comprising reading values from a plurality of ways and keeping only the value from a way W; and
  encoding W in way bits of a register.

9. The cache controller of claim 8, wherein the register comprises N way bits, a wait-for-way flag, and a no-hit bit.

10. The cache controller of claim 8, wherein circuitry and logic are further operable for checking way W for a desired value without accessing any additional ways in the cache.

11. The cache controller of claim 8, further comprising an adder, and wherein the circuitry and logic are further operable for:
   searching way W for the desired value only if the result of an add operation in the adder indicates that the desired value is within a present cache line.

12. The cache controller of claim 11, wherein the result of the add operation comprises only a portion of the full add operation.

13. The cache controller of claim 11, wherein the result of the add operation comprises only a portion of the least significant output bits of the adder.

14. The cache controller of claim 8, wherein the circuitry and logic are further operable for:
   accessing a first value in cache, determining that a no-hit bit is set, and setting a wait-for-way bit; and
   accessing a second value in cache, determining that the wait-for-way bit is set, receiving W from the cache, and encoding W in the register.

15. A method for way prediction in a processor having an N-way cache, comprising:
   accessing a value from the cache comprising reading values from a plurality of ways and keeping only the value from a way W; and
   encoding W in way bits of a register.

16. The method of claim 15, further comprising searching way W for a desired value without accessing any additional ways in the cache.

17. The method of claim 16, wherein the accessing the value further comprises:
   searching way W for the desired value only if taking the result of an add operation indicates that the desired value is within a present cache line.

18. The method of claim 17, wherein taking the result of the add operation comprises taking only a portion of the full add operation.

19. The method of claim 17, wherein taking the result of the add operation comprises taking only a portion of the least significant output bits of an adder.

20. The method of claim 15, further comprising:
   accessing a first value in cache, determining that a no-hit bit is set, and setting a wait-for-way bit; and
   accessing a second value in cache, determining that the wait-for-way bit is set, and encode W in the register.

* * * * *